Patented Mar. 29, 1932

1,851,852

UNITED STATES PATENT OFFICE

STANLEY ISAAC LEVY, OF LONDON, ENGLAND

TREATMENT OF CHLORIDE SOLUTIONS

No Drawing. Application filed February 25, 1928, Serial No. 257,091, and in Great Britain February 10, 1928.

This invention relates to the treatment of chloride solutions obtained from iron pyrites, for separation of pure ferrous chloride and the recovery of zinc and lead. When iron pyrites is heated in an inert atmosphere, there is obtained a "mainly soluble" residue which contains iron, copper, lead and zinc, and when this residue is treated with hydrochloric acid, about 90% of the iron contained in it passes into solution as ferrous chloride, together with all the lead and part of the zinc, leaving a copper-rich residue from which the solution may be filtered. The lead may be removed from this solution by electrolysis. The solution left may be evaporated to dryness, whereby there is obtained crystalline ferrous chloride containing a small amount of zinc chloride, which ferrous chloride may be treated in a current of air with or without steam in a suitable furnace for recovery of hydrochloric acid and the preparation of ferric oxide. This treatment of the solution has three disadvantages; firstly the evaporation is slow and expensive, secondly the iron oxide obtained is contaminated with zinc, and finally the zinc is lost.

These disadvantages are avoided by causing the ferrous chloride to separate in the solid state, leaving the zinc in solution. For this purpose in accordance with the present invention there is utilized gaseous hydrochloric acid subsequently recovered from the ferrous chloride as described in my co-pending applications for patent Serial Nos. 259,317 and 257,094, filed respectively on March 5, 1928 and February 25, 1928. My invention may be carried out in two ways. In the first the liquor is used, after separation of the lead by any convenient method, as the vehicle in which a further quantity of "mainly soluble" residue is treated, the liquor being circulated through suitable absorbers to take up the hydrochloric acid gas required for the reaction of the hot liquor with the further quantity of "mainly soluble" residue. In this way a further quantity of ferrous chloride is brought into the solution, the quantity being so chosen that the liquor at the end of the reaction is saturated with ferrous chloride at 100° C. to the extent of about 90%. The insoluble residue is filtered from the solution at 100° C. or over, and washed with a little boiling water, the washings being reserved to add to the liquor for the next charge; the hot filtrate is then cooled, whereupon the ferrous chloride separates in the form of the crystalline tetrahydrate, $FeCl_2 4H_2O$. The cooling may be effected by means of towers, rockers, or cooling tanks or vessels in known manner. The crystals are removed from the mother liquor by filtration, and washed with a little saturated ferrous chloride solution previously prepared, to remove the adherent mother liquor, which contains zinc chloride and possibly lead chloride. It will be seen that a quantity of water, namely 4 molecules for each molecule of ferrous chloride, is removed from the cycle with the crystals, and that therefore this quantity may be added for the next operation in the form of washings from the residues, crystals, etc. of a previous operation; in this way the water in the cycle is kept constant, whilst effective washing is carried out. The solubilities of ferrous chloride at different temperatures are such that a solution nearly saturated with ferrous chloride at 100° C. deposits about one half of the ferrous chloride it contains when cooled to 20° C. and are therefore almost ideal for this operation.

The water contained in the crystals must be driven off by evaporation, but the quantity is small, about 35% of the weight of the crystals only, and the operation is easily and cheaply effected by the use of waste heat.

By repeated employment of the mother liquor as the vehicle for treating further quantities of "mainly soluble" residue, the concentration of zinc rapidly rises; when this is high enough to make it difficult to avoid loss of zinc in the crystals, say about 80-100 grams of zinc per litre, or more, the liquor is withdrawn from the cycle, and concentrated by heating or otherwise until the bulk of the remaining ferrous chloride separates on cooling, leaving the zinc in solution with relatively little iron, from which it is easily evaporated by known methods. In this way the zinc which goes into solution when the "mainly soluble" residue is treated with hydrochloric acid is easily and cheaply recovered.

The concentration of lead in the solution may be varied in this way at the same time, if electrolysis is not effected at each operation. In this case, however, the limit of solubility of the lead chloride is saturated ferrous chloride, equivalent to a lead content of about 15 grams per litre, is soon reached, so that electrolysis should be effected at every second or third repetition of the cycle, according to the lead content of the original pyrites.

In the second way of carrying out my invention, the liquor, after treatment of the "mainly soluble" residue with hydrochloric acid is filtered from the copper-rich residue, and the lead removed by electrolysis. The liquor is then treated with hydrochloric acid gas recovered from ferrous chloride previously obtained; the gas dissolves very readily, causing immediate separation of crystalline ferrous chloride. The absorption vessel must be so designed as to avoid blockage of the gas inlet pipes by rapid separation of ferrous chloride. After saturation with hydrochloric acid gas, the liquor is cooled and filtered through porous earthenware, silica, or vulcanite filters, and the crystals are washed as before with saturated ferrous chloride or with hydrochloric acid solution. The acid liquor freed from the crystals is now employed to attack a second quantity of the "mainly soluble" residue, the cycle being then repeated indefinitely as in the alternative method. The zinc concentrates in the mother liquor as before, and after such a number of cycles that the concentration reaches 100 grams per litre or other suitable proportion, the liquor is withdrawn from the cycle for removal of the zinc. The ferrous chloride remaining in this liquor may be removed by further concentration or by further saturation with hydrochloric acid gas, and the zinc-rich liquor refined and treated by electrolysis or precipitation or otherwise in known manner, to yield a suitable zinc product.

I claim:

1. A cyclic process for the recovery of ferrous chloride and zinc from ferrous chloride solutions containing zinc, consisting in causing the ferrous chloride solution to absorb hydrochloric acid gas and to react while hot with materials containing iron and zinc until the liquor is nearly saturated whilst hot with ferrous chloride, filtering and cooling the solution to deposit ferrous chloride crystals, and removing the solution from the cycle after the quantity of zinc contained therein has been sufficiently increased by a number of repetitions of such cycle.

2. A cyclic process for the recovery of ferrous chloride and zinc from ferrous chloride solutions containing zinc, consisting in causing the ferrous chloride solution to absorb hydrochloric acid gas and to deposit ferrous chloride crystals, filtering and using the acid liquor to react on further quantities of materials containing iron and zinc, and removing the solution from the cycle after the quantity of zinc contained therein has been sufficiently increased by a number of repetitions of such cycle.

3. A cyclic process for the recovery of ferrous chloride and zinc from ferrous chloride solutions containing zinc, consisting in causing the ferrous chloride solution to absorb hydrochloric acid gas and to react while hot with materials containing iron and zinc until the liquor is nearly saturated whilst hot with ferrous chloride, filtering and cooling the solution to deposit ferrous chloride crystals, removing the solution from the cycle after the quantity of zinc contained therein has been sufficiently increased by a number of repetitions of such cycle, and treating the zinc-rich solution to separate the bulk of the ferrous chloride remaining.

4. A cyclic process for the recovery of ferrous chloride and zinc from ferrous chloride solutions containing zinc, consisting in causing the ferrous chloride solution to absorb hydrochloric acid gas and to deposit ferrous chloride crystals, filtering and using the acid liquor to react on further quantities of materials containing iron and zinc, and removing the solution from the cycle after the quantity of zinc contained therein has been sufficiently increased by a number of repetitions of such cycle and treating the zinc-rich solution to separate the bulk of the ferrous chloride remaining.

5. A process for the recovery of ferrous chloride in crystalline form from ferrous chloride solutions containing lead, consisting in separating the lead by electrolysis, causing the ferrous chloride solution to absorb hydrochloric acid gas and to react while hot with materials containing iron until the liquor is saturated with ferrous chloride to the extent of about 90% at 100° C., filtering, and cooling the filtrate to separate out the ferrous chloride.

6. A cyclic process for the recovery of ferrous chloride lead and zinc from ferrous chloride solutions containing lead and zinc, consisting in electrolyzing the solution to remove lead, causing the ferrous chloride solution to absorb hydrochloric acid gas and to deposit ferrous chloride crystals, fitering and using the acid liquor to react on further quantities of materials containing iron, lead and zinc and repeating the cycle.

7. A cyclic process for the recovery of ferrous chloride lead and zinc from ferrous chloride solutions containing lead and zinc, consisting in electrolyzing the solution to remove lead, causing the ferrous chloride solution to absorb hydrochloric acid gas and to deposit ferrous chloride crystals, filtering and using the acid liquor to react on further quantities of materials containing iron, lead and zinc, repeating the cycle and finally removing the solution from the cycle after the quantity of zinc contained therein has been sufficiently increased by a number of repetitions of such cycle.

8. A process for the recovery of ferrous chloride in crystalline form and lead from ferrous chloride solutions containing iron and lead consisting in electrolyzing to remove lead, causing the ferrous chloride solution to absorb hydrochloric acid gas and to react while hot with materials containing iron and lead until the liquor is saturated with ferrous chloride to the extent of about 90% at 100° C., filtering, and cooling the filtrate to separate out the ferrous chloride, electrolyzing to remove lead, and repeating the cycle.

9. A cyclic process for the recovery of ferrous chloride, lead and zinc from ferrous chloride solutions containing lead and zinc, consisting in electrolyzing the solution to remove lead, causing the ferrous chloride solution to absorb hydrochloric acid gas and to react while hot with materials containing iron, lead and zinc until the liquor is nearly saturated whilst hot with ferrous chloride, cooling the solution to deposit ferrous chloride crystals, filtering and repeating the cycle, and finally removing the solution from the cycle after the quantity of zinc contained therein has been sufficiently increased by a number of repetitions of the cycle.

10. A cyclic process for the recovery of ferrous chloride, lead and zinc from ferrous chloride solutions containing lead and zinc, consisting in electrolyzing the solution to remove lead, causing the ferrous chloride solution to absorb hydrochloric acid gas and to react while hot with materials containing iron, lead and zinc until the liquor is nearly saturated whilst hot with ferrous chloride, cooling the solution to deposit ferrous chloride crystals, filtering and repeating the cycle and treating the eventual zinc-rich solution to separate the bulk of the ferrous chloride remaining.

11. A process for the recovery of ferrous chloride in crystalline form which comprises absorbing gaseous hydrochloric acid in a solution already containing ferrous chloride, separating ferrous chloride crystals from said solution, and causing the solution from which the ferrous chloride crystals have been separated to react with material containing iron to form further quantities of ferrous chloride solution which may be used to absorb gaseous hydrochloric acid.

In testimony whereof I have signed my name to this specification.

STANLEY ISAAC LEVY.